United States Patent
Louw et al.

[11] 3,897,896
[45] Aug. 5, 1975

[54] FRICTION WELDING APPARATUS WITH CHUCK MEANS

[75] Inventors: Johan August Louw, Orange; Robert Earle Ghiselin, Costa Mesa, both of Calif.

[73] Assignee: Textron Inc., Santa Ana, Calif.

[22] Filed: Apr. 4, 1973

[21] Appl. No.: 347,974

[52] U.S. Cl. .................... 228/2; 29/470.3; 279/51
[51] Int. Cl.² ........................................ B23K 19/02
[58] Field of Search .......... 228/2; 29/470.3; 279/51; 156/73, 580

[56] References Cited
UNITED STATES PATENTS

| | | | |
|---|---|---|---|
| 2,942,748 | 6/1960 | Anderson | 29/470.3 X |
| 3,478,411 | 11/1969 | Goloff et al | 29/470.3 |
| 3,504,425 | 4/1970 | Satovsky et al | 228/2 X |
| 3,512,792 | 5/1970 | Farley et al | 279/51 |
| 3,599,998 | 8/1971 | Kiwalle et al | 228/2 X |

Primary Examiner—Francis S. Husar
Assistant Examiner—Gus T. Hampilos
Attorney, Agent, or Firm—Harvey C. Nienow

[57] ABSTRACT

A low inertia chucking device for use in friction welding apparatus for chucking relatively small workpieces for quick and easy loading and unloading. such device comprises a workpiece holder having a tapered opening for receiving a tapered portion on the workpiece or a tapered collet, the latter of which is formed with segments whereby the workpiece is gripped by the collet as the latter is gripped by the workpiece holder.

10 Claims, 8 Drawing Figures

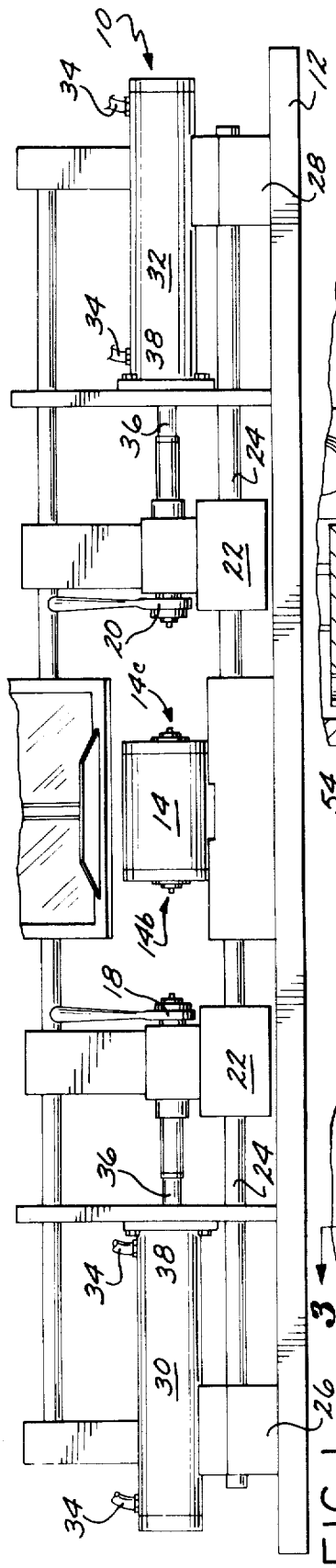
FIG.1
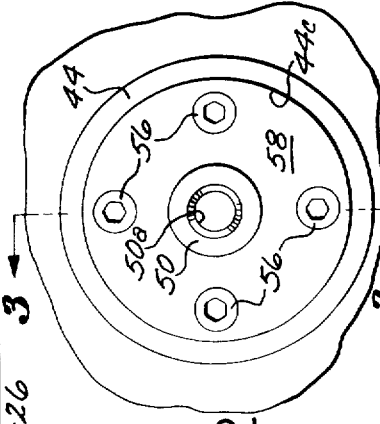
FIG.2
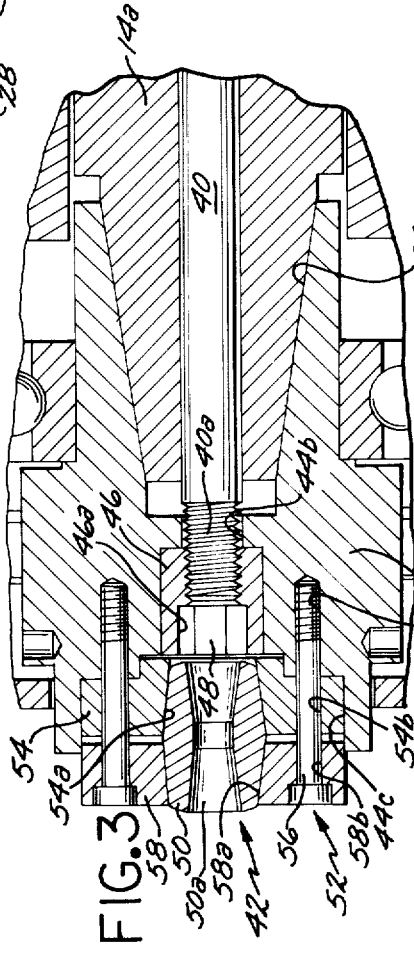
FIG.3
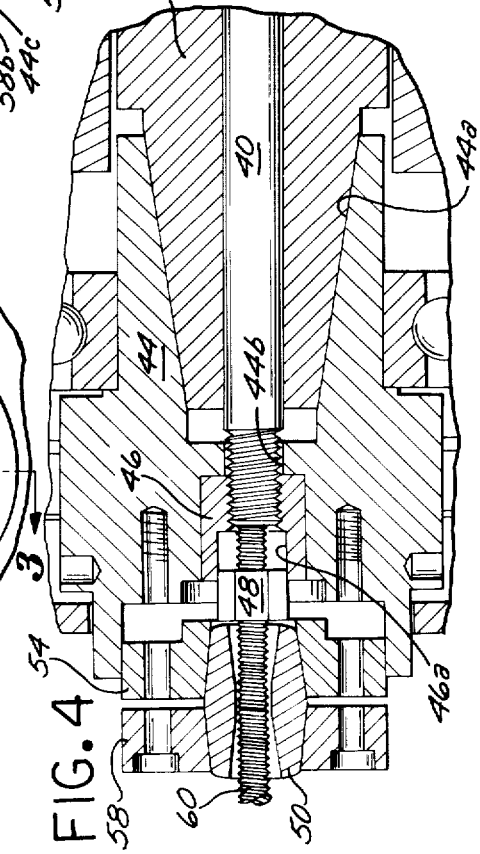
FIG.5
FIG.4

PATENTED AUG 5 1975 3,897,896

SHEET 2

FRICTION WELDING APPARATUS WITH CHUCK MEANS

The present invention relates generally to friction welding apparatus, and more particularly to low inertia chucking means for quick and easy receiving and ejecting relatively small workpieces.

Within the past decade or so, friction welding apparatus has become increasingly effective in welding together metallic parts or components having special characteristics. Frequently, it is desirable to make a given part or component out of several different types of metals or materials in order to make use of the different chemical and physical properties.

Typically, such apparatus retains a first workpiece in a given non-rotatable position, and brings into engagement therewith a second workpiece which is rotating at a predetermined speed. Such engagement of the relatively moving workpieces generates considerable friction and corresponding heat so that ultimately the several workpieces are caused to amalgamate or weld together, with or without having reached a plastic state. The speed which must be attained is related to the amount of heat necessary to effectuate the desired weld, and this, in turn, is related to the mass of the workpieces as well as the material of which they are composed.

In the friction welding of relatively small workpieces, it is necessary for the rotating workpiece to attain a relatively high rotation speed in order to have sufficient surface speed of such a small workpiece to generate the necessary heat. Rotational speed of as much as 100,000 rpm may be required.

To this point in the development of such friction welding apparatus, it has been difficult to provide a means for chucking such small workpieces, such that the chuck is of extremely low inertia so as to enable the workpiece to be brought up to the extremely high rotational speed without excessive energy being stored in said chuck.

Accordingly, it is an object of the present invention to provide, in friction welding apparatus, chucking means for relatively small workpieces which quickly receives and retains a workpiece against torsional forces incurred during the friction portion of the operation.

Another object of the present invention is to provide, in friction welding apparatus, chuck means as characterized above whereby the frictional engagement of the workpieces causes the chuck means to be stronger and more effective in retaining the workpiece in proper position.

A further object of the present invention is to provide, in friction welding apparatus, chuck means as characterized above wherein the workpiece can be easily and quickly ejected following the desired welding operation.

A still further object of the present invention is to provide, in friction welding apparatus, chuck means as characterized above which is operable to exert a gripping force against torsional forces which is proportional to the amount of end thrust occasioned by engagement of the workpieces.

An even further object of the present invention is to provide, in friction welding apparatus, chuck means as characterized above which comprises a collet having an external taper which cooperates with a complementally formed tapered opening in a workpiece holder, and which collet is operable to grip the workpiece as the collet is urged more deeply into the tapered opening.

A still further object of the present invention is to provide, in friction welding apparatus, chuck means as characterized above which is simple and inexpensive to manufacture and which is rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a side elevational view of friction welding apparatus having chuck means according to the present invention, FIG. 2 is a fragmentary end view of the chuck means associated with the high speed motor of the apparatus of FIG. 1.

FIG. 3 is a fragmentary sectional view taken substantially along line 3—3 of FIG. 2.

FIG. 4 is a fragmentary sectional view similar to FIG. 3 but showing the tapered member partially removed from the workpiece holder.

FIG. 5 is an exploded view of the tapered member and retaining means therefor;

Like reference characters indicate corresponding parts throughout the several views of the drawings.

Figure 6:
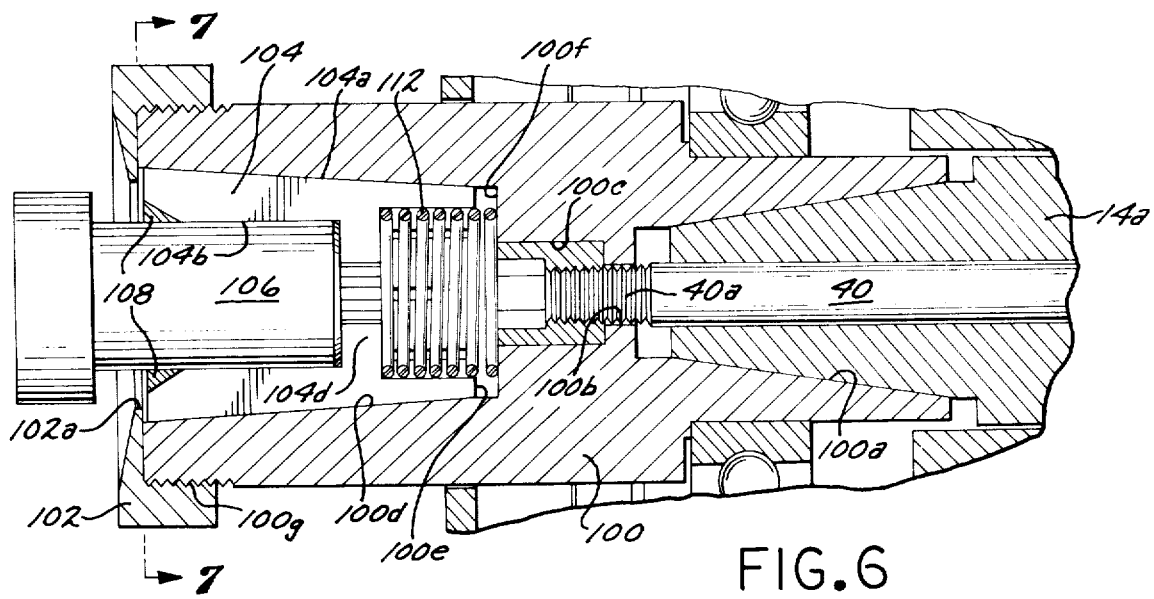
FIG. 6 is a sectional view of a second embodiment of the present invention.

Referring to FIG. 1 of the drawings, there is shown therein friction welding apparatus 10 mounted on a platform or bench 12. It will be noted that the apparatus 10 is generally symmetrical about the vertical center line where a high speed motor 14 is mounted on a support 16.

Motor 14 is constructed in a special manner so as to be capable of attaining relatively high rotational speeds. Both the spindle or rotor 14a of motor 14 and the stator (not shown) are constructed in a special manner to provide a squirrel cage motor which is capable of attaining relatively high speed operation.

The high rotational speed is essential if sufficient heat is to be generated to effect strong welds of relatively small workpieces. That is, since the workpieces are small, the mean or average diameter of the engaging surfaces is also small thus creating a correspondingly low lineal speed for a given rpm. Thus, in order to increase the lineal speed of such small diameter parts, it is necessary to increase appreciably the rotational or angular speed. Generally, such speeds, for parts on the order of one-eighth inch in diameter, may approach 100,000 rpm.

The rotor 14a of motor 14, as shown most particularly in FIG. 1 of the drawings, has its opposite ends 14b and 14c provided with means for gripping and retaining substantially identical workpieces.

Once the rotor and workpieces are brought up to speed, non-rotatable workpieces are moved into engagement therewith. To accomplish this, there is provided movable chuck assemblies 18 and 20, each of which is mounted on a movable block or base 22. Each block 22 is provided with suitable through openings for slidably engaging support rods 24 which are firmly connected to support 16 as well as additional supports 26 and 28.

To quickly move the respective chuck assembly 18 and 20 toward motor 14, there is provided hydraulic actuators 30 and 32 respectively. Such hydraulic actuators are connected to suitable sources of hydraulic fluid under pressure through conduits 34 and appropriate control valves (not shown) whereby a piston rod can be moved with respect to the corresponding cylinder 38. As a result of such apparatus, workpieces mounted in the check assemblies 18 and 22 can be quickly and effectively moved into engagement with the rotating workpieces mounted in the opposite ends of the rotor 14a and motor 14. If this occurs after motor 14 has attained the proper speed, the frictional engagement of the workpieces generates sufficient heat as a result of friction that the parts or workpieces become welded together.

Referring to FIG. 3 of the drawings it is seen that the rotor 14a comprises a shaft 40 the opposite ends of which are formed with external fastening threads 40a. A workpiece holder 42 is mounted on each end of rotor 14a by threads 40a as will herinafter become more apparent.

Each such workpiece holder 42 comprises a member 44 formed with a conical opening 44a which is complemental of the conically shaped end portion of rotor 14a. Member 44, as shown most particularly in FIGS. 3 and 4 of the drawings is adapted to receive bearing means whereby the entire rotor is rotationally mounted within a suitable housing for motor 14.

Each member 44 is further formed with a through opening 44b through which the threaded end portion 40a of shaft 40 extends for engagement with fastening nut 46. Such nut 46 is formed with a hexagonal opening or recess 46a to receive and retain an ordinary hexagonal nut 48, as will hereinafter be explained in greater detail.

Each member 44 is further provided with a cylindrical end recess 44c for receiving a tapered member 50 and retaining means 52 therefor. Such retaining means comprises a first retaining member 54 formed with a tapered central opening 54a and four equiangularly spaced through openings 54b, through which pass the shank or body of fastening bolts 56. A second retaining member 58 having a corresponding tapered central opening 58a is also provided, there being suitable equiangularly spaced bolt receiving holes 58b for alignment with the aforementioned openings 54b. In this regard, member 44 is provided with four corresponding openings 44d each of which is provided with fastening threads for receiving bolts 56.

The tapered member 50 is provided with a through opening 50a the opposite ends of which are tapered outwardly as shown most clearly in FIGS. 3 and 5 of the drawings. Such identically tapered opposite end portions enable such member to be used in two opposite positions as will hereinafter become more apparent.

To permit quick and easy replacement, tapered member 50 is provided with an exterior surface which is tapered at its opposite end portions as shown most particularly in FIGS. 3 and 5 of the drawings, to correspond to and mate with the tapered surfaces of the through openings 54a and 58a of retaining members 54 and 58 respectively.

The chuck means 42 shown in FIG. 3 of the drawings is assembled to member 44 in the following manner. With the retaining means 42 initially disassociated therewith, the hexagonal nut 48 is placed in the hexagonal recess 46a of fastening nut 46. Thereafter, the first and second retaining members 54 and 58 are brought together with the tapered member 50 transposed therebetween as depicted most clearly in the exploded view of FIG. 5 of the drawings. In this manner, the tapered exterior portion of member 50 is engaged by the retaining member 54 and 58 so that the former is gripped between the latter. Thereafter, the retaining members are placed within the cylindrical end opening 44c of member 44 and the four fastening bolts 56 are positioned as shown in FIG. 3.

The chuck means shown in FIG. 3 is operable to firmly grip a tapered workpiece. For instance, in the making of rivets, it is frequently desirable to have the end or tail of the rivet tapered for ease of insertion into a suitable opening. Such taper can be made to correspond to the desired taper for use in member 50. Through considerable research it has been determined that the angle between the longitudinal center line of the workpiece and the side wall of the tapered portion thereof should be approximately 2° to 8°. Thus, the included angle between oppositedly disposed sides of the tapered workpiece would be between four and sixteen degrees.

Each tapered end portion of member 50 should correspond to the tapered end of the workpiece so that there will be a gripping action therebetween against torsional forces as will hereinafter become more apparent.

Thus, an operator can quickly insert into the end of tapered member 50 the complementally tapered end of the workpiece. Such workpiece will remain there due to the close tapered fit. This condition will prevail as the motor 14 increases in speed provided the tapers are within the above indicated range.

After the motor reaches its desired speed, the appropriate hydraulic cylinders 30 and 32 are activated to bring the non-rotatable workpieces into engagement with the respective rotating workpieces. Such non-rotating workpieces might, in the making of rivets, be the head portion of the rivet to be attached to aforementioned tapered tail portion.

As the non-rotating workpieces engage the rotating workpieces, the axial force or thrust of each such engagement urges the tapered workpiece deeper into the tapered opening 50a of member 50. This increases the retaining force of member 50 against the torque thus generated. With the bolts 56 holding the member 50 against rotation, sufficient heat will be generated to effect the desired weld.

Thereafter, when the friction welding apparatus comes to rest, the welded part is removed from member 50 merely by gripping and pulling it out. This is readily accomplished provided the aforementioned limits on the taper are used.

When it is desired to replace the tapered member 50 or to reversely position the same to use the opposite end thereof, it is merely necessary to loosen bolts 56 and remove retainer member 58 and member 50. To facilitate this, as shown most particularly in FIG. 4 of the drawings a bolt or other threaded rod 60 is inserted through the opening in member 50 and into threaded engagement with nut 48. Rotation of rod 60 causes nut 48 to be moved out of hexagonal recess 46a against the retaining means 52. Thus, the retaining members 54 and 56 can be separated from each other and from member 50 as shown most particularly in FIG. 5 of the drawings.

Referring to FIG. 6 of the drawing there is shown therein a second embodiment of the present invention. As will be recognized by those persons skilled in the art, the end member 100 of this embodiment is provided with a conical opening 100a, a through opening 100b and a cylindrical recess 100c, all of which correspond to similar openings in end member 44 of the first embodiment. Additionally, however, end member 100 is provided with a frusto-conical cavity 100d which terminates in a cylindrical opening 100e. Opening 100e is larger than recess 100c thus providing an annular ledge or shoulder 100f therebetween.

The end of member 100 is formed with external fastening threads 100g for receiving a collar 102 which is formed with a through opening 102a for exposing certain internal parts while retaining a collet 104 within the end member 100.

Figure 7:
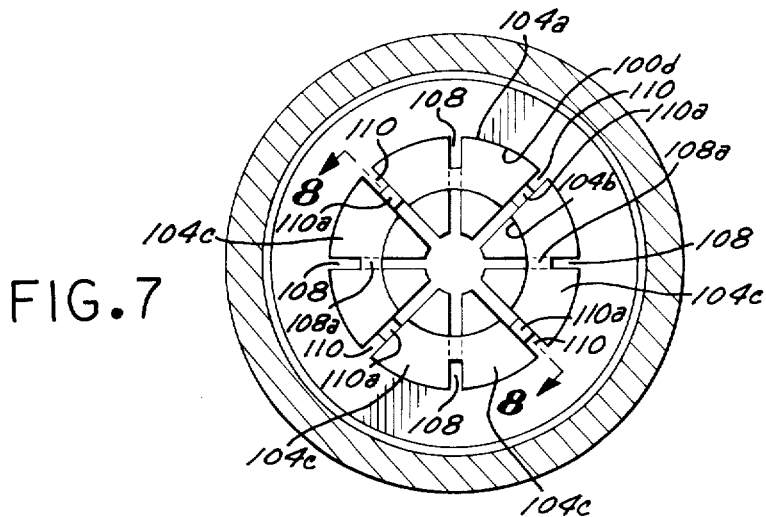
FIG. 7 is a transverse sectional view of the collet of FIG. 6 taken substantially along line 7—7 of FIG. 6.
Figure 8:
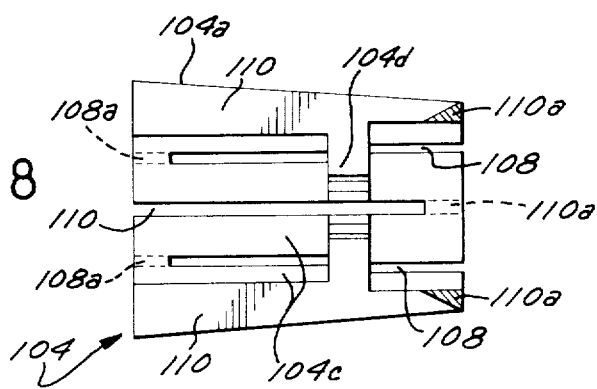
FIG. 8 is a longitudinal sectional view of the collet taken substantially along line 8—8 of FIG. 7.

As shown in FIG. 7 and FIG. 8 of the drawings collet 104 is formed in an unique manner to provide certain desirable functions. Firstly, it is provided with a tapered exterior surface 104a which is formed complementally of the frusto-conical cavity 100d of member 100. This is essential to enable collet 104 to firmly engage member 100 as will hereinafter become apparent.

Additionally, collet 104 is formed with a non-tapered through opening 104b which is adapted to receive and grip the desired workpiece as shown at 106 in the drawings.

To enable the collet to firmly grip the member 100 and the workpiece 106, the conical wall or body of collet 104 is formed into a plurality of segments 104c. As shown in the drawings, the second embodiment comprises eight such segments 104c. They are formed by an appropriate number of circumferentially spaced saw cuts which are alternately cut from opposite ends of the collet, and which do not extend the entire length of the collet. That is, the saw cuts 108 of FIG. 7 are made from the right hand end of the collet as positioned in FIG. 6, thus leaving connecting portions 108a as shown most clearly in FIGS. 6 and 7. The intermediate saw cuts, namely those designated with the numeral 110, are made from the left hand end of collet 104 as positioned in FIG. 6 thus leaving connecting portions 110a as shown most clearly in FIGS. 7 and 8 of the drawings. In this manner, a connecting portion of triangular cross section is interposed between each adjacent pair of segments 104, with such connecting portions being longitudinally spaced or offset from the connecting portions which are closest thereto.

This arrangement enables the collet to be reduced in diameter as it is forced into the cavity 100d of member 100 as will hereinafter be explained in greater detail. By selecting the proper heat treating operation and by having the collet in a predetermined shape and size when heat treated, the resulting collet 104 can be made to have a resiliency or elasticity in its lateral or transverse direction to quickly and easily grip workpiece and to release the same as the collet moves back and forth within the tapered cavity 100d.

Collet 104 is further formed with a transverse partition wall 104d which affords a shoulder for one end of a compression spring 112. Such spring operates between partition wall 104d and the shoulder 100f of member 100 to urge the collet 104 to the left as viewed in FIG. 6.

The second embodiment is assembled by placing the compression spring 112 and collect 104 into the cavity 100d and thereafter threadedly mounting the collar 102 on the end of member 100. Collar 102 is operable to prevent spring 112 from pushing collet 104 out of cavity 100d.

With the collet unloaded or without a workpiece mounted therein, compression spring 112 operates to push collet 104 to its leftmost position in engagement with collar 102. The inherent resiliency or elasticity of said collet causes the same to expand to its transverse direction to continually contact the tapered cavity 100d.

Such action, of course, enlarges the opening 104b of collet 104 for the receipt of a workpiece.

When it is desired to load the collet it is merely necessary to insert the workpiece into the opening 104b. By urging such workpiece to the right against partition wall 104d (as viewed in FIG. 6) sufficient binding or frictional engagement results between the collet and the cavity to cause the latter to grip the workpiece and to be held within the cavity. Thereafter when the motor 14 (FIG. 1) attains the proper speed, the workpiece are brought into engagement to generate the heat necessary for effecting the desired weld. Such engagement of the workpieces causes an end thrust which tends to move the workpiece 106 to the right as viewed in FIG. 6. This causes collet 104 to be forced deeper into the taper cavity 100d thus causing the collet to tend to be further reduced in cross sectional so as to firmly grip workpiece 106. It is thus seen that as the thrust or end force increases so does the gripping force of the collet within the end member 100 and about the workpiece 106.

When the weld has been completed and motor 14 has come to rest, the welded part can be removed manually, while the compression spring 112 moves the collet 104 to the left as viewed in FIG. 6. Thus the collet is returned to its open or expanded cross sectional condition.

The present invention provides workpiece holding means for relatively small parts to be friction welded such workpiece holding means having extremely low inertia to enable the workpiece to be rotated at extremely high speeds, and the workpiece nonetheless being quickly and easily inserted into and removed therefrom.

We claim:

1. Welding apparatus for welding together workpieces by heat generated from engagement of relatively moving workpieces comprising in combination, first and second relatively moveable workpiece holders one of which is adapted to rotate a workpiece and the other of which is adapted to retain a workpiece against rotation, means for moving said workpiece holders relative to each other to effect engagement of said workpieces, chuck means for one of said workpieces fixed to the respective workpiece holder for movement therewith and comprising a member formed with a tapered opening, and means on said one workpiece comprising a taper formed substantially complimentally of said tapered opening, said taper means on said one workpiece engaging said tapered opening to thereby provide the only means for retaining said workpiece non-rotatable relative to its holder throughout engagement of said workpieces.

2. Welding apparatus for welding together workpieces by heat generated from engagement of relatively moving workpieces according to claim 1 wherein said means on said one workpiece comprises a tapered portion formed on said workpiece.

3. Welding apparatus for welding together workpieces by heat generated from engagement of relatively moving workpieces according to claim 2 wherein said workpiece holders are so arranged that engagement of said workpieces to generate the welding heat urges the tapered portion of said workpiece into said tapered opening to cause said workpiece to be firmly held by said workpiece holder.

4. Welding apparatus for welding together workpieces by heat generated from engagement of relatively moving workpieces according to claim 3 wherein the surfaces of said tapered opening and the tapered portion of the respective workpiece are frusto-conical having side walls angularly disposed to the respective longitudinal axis within the range of two to eight degrees.

5. Welding apparatus for welding together workpieces by heat generated from engagement of relatively moving workpieces according to claim 1 wherein said means on said one workpiece comprises a collet interposed between said one workpiece and its holder.

6. Welding apparatus for welding together workpieces by heat generated from engagement of relatively moving workpieces according to claim 5 wherein said collet comprises means for gripping said one workpiece.

7. Welding apparatus for welding together workpieces by heat generated from engagement of relatively moving workpieces according to claim 6 wherein said collet is formed with a taper complemental to said tapered opening and said gripping means of said collet is responsive to engagement of the taper on said collet and said tapered opening as effected by the heat generating engagement of said workpieces to firmly grip the respective workpiece.

8. Welding apparatus for welding together workpieces by heat generated from engagement of relatively moving workpieces according to claim 7 wherein said collet is formed with a plurality of segments extending longitudinal and joined by longitudinally spaced transverse connecting portions whereby engagement of the taper of said collet and said tapered opening tend toward reducing the size of said collet to cause the gripping means of the latter to grip said workpiece.

9. Welding apparatus for welding together workpieces by heat generated from engagement of relatively moving workpieces according to claim 8 wherein each segment is attached to each adjacent segment by a connecting portion, each of said connecting portions being longitudinally spaced from the connecting portion circumferentially closest thereto.

10. Welding apparatus for welding together workpieces by heat generated from engagement of relatively moving workpieces according to claim 9 wherein the tapered opening and the taper of said collet are frusto-conical having side walls angularly disposed to the respective longitudinal axis within the range of two to eight degrees.

* * * * *